United States Patent
Jin et al.

(10) Patent No.: US 12,455,726 B2
(45) Date of Patent: Oct. 28, 2025

(54) GRAPHICAL PROGRAMMING METHOD, PROCESSOR, AND TERMINAL

(71) Applicant: Siemens Ltd., China, Beijing (CN)

(72) Inventors: Xin Jin, Beijing (CN); Liang Liao, Beijing (CN); Jun Yi Shan, Yingkou (CN)

(73) Assignee: SIEMENS LTD., CHINA, Beijing (CN)

(*) Notice: Subject to any disclaimer, the term of this patent is extended or adjusted under 35 U.S.C. 154(b) by 397 days.

(21) Appl. No.: 18/003,756

(22) PCT Filed: Jun. 30, 2020

(86) PCT No.: PCT/CN2020/099372
§ 371 (c)(1),
(2) Date: Dec. 29, 2022

(87) PCT Pub. No.: WO2022/000293
PCT Pub. Date: Jan. 6, 2022

(65) Prior Publication Data
US 2023/0259334 A1    Aug. 17, 2023

(51) Int. Cl.
*G06F 9/44*    (2018.01)
*G06F 3/0486*    (2013.01)
(Continued)

(52) U.S. Cl.
CPC .............. *G06F 8/34* (2013.01); *G06F 3/0486* (2013.01); *G06F 8/38* (2013.01)

(58) Field of Classification Search
CPC ............ G06F 8/34; G06F 8/38; G06F 3/0486
See application file for complete search history.

(56) References Cited

U.S. PATENT DOCUMENTS

| | | | |
|---|---|---|---|
| 2002/0004804 A1 | 1/2002 | Muenzel | 715/239 |
| 2002/0046397 A1 | 4/2002 | Schmitt et al. | 717/125 |

(Continued)

FOREIGN PATENT DOCUMENTS

| | | | |
|---|---|---|---|
| CN | 106020801 A | 10/2016 | G06F 9/44 |
| CN | 108 154 910 | 6/2018 | G16H 20/13 |

(Continued)

OTHER PUBLICATIONS

Chinese Office Action, Application No. 202080101587.9, 6 pages, Nov. 1, 2024.

(Continued)

*Primary Examiner* — Qamrun Nahar
(74) *Attorney, Agent, or Firm* — Slayden Grubert Beard PLLC

(57) ABSTRACT

Various embodiments include a graphical programming method comprising: in a first interface, displaying a programming flowchart matching a target task, with at least two function blocks, and using the first interface to configure the function blocks and an execution logic between the function blocks; determining a first and a second function block from the programming flowchart, wherein the first function block is used for obtaining two pieces of information to be processed, and the second function block is used for obtaining information processing results corresponding to the first information; and configuring a control between the first function block and the second function block, used for determining a current information processing result according to the first information currently detected from the first function block and transmitting the current processing result to the second function block.

10 Claims, 11 Drawing Sheets

(51) Int. Cl.
    *G06F 8/34*     (2018.01)
    *G06F 8/38*     (2018.01)

(56) References Cited

U.S. PATENT DOCUMENTS

| | | | |
|---|---|---|---|
| 2009/0019380 A1* | 1/2009 | Tanaka | G06F 8/34 715/763 |
| 2009/0133035 A1* | 5/2009 | Bassu | G06F 8/34 719/313 |
| 2016/0054982 A1* | 2/2016 | Itani | G06F 8/34 717/105 |
| 2017/0199648 A1* | 7/2017 | Raffo | G06F 8/34 |

FOREIGN PATENT DOCUMENTS

| | | | | |
|---|---|---|---|---|
| CN | 109 254 770 | 1/2019 | | G06F 8/38 |
| CN | 109 634 596 | 4/2019 | | G06F 8/34 |
| CN | 110497412 A | 11/2019 | | B25J 9/16 |
| CN | 110 941 426 | 3/2020 | | G06F 8/34 |
| CN | 111158669 A | 5/2020 | | G05B 19/05 |

OTHER PUBLICATIONS

Extended European Search Report, Application No. 20942794.7, 10 pages, Apr. 19, 2024.

Search Report for International Application No. PCT/CN2020/099372, 13 pages, Apr. 1, 2021.

\* cited by examiner

GRAPHICAL PROGRAMMING METHOD, PROCESSOR, AND TERMINAL

CROSS-REFERENCE TO RELATED APPLICATIONS

This application is a U.S. National Stage Application of International Application No. PCT/CN2020/099372 filed Jun. 30, 2020, which designates the United States of America, the contents of which are hereby incorporated by reference in their entirety.

TECHNICAL FIELD

The present disclosure relates to the field of electronic control. Various embodiments of the teachings herein include graphical programming methods, processors, and/or terminals.

BACKGROUND

In many tools that automatically manage production line projects by robots, a plurality of tasks are often set for different objects on a production line. A graphical programming flowchart used to manage different objects and their corresponding tasks usually have many cross lines with confusing connections, which makes it difficult for many engineers to understand the integration or flow process of various tasks on the production line.

At present, a commonly used method in the background system is to manually write program files by programmers to call different functional modules or data ports, so as to achieve the purpose of task management. However, these functional modules or data ports are independent of each other, and have not established any relationship with the user's actual application scenario from the user's perspective.

SUMMARY

The teachings of the present disclosure describe graphical programming methods, processors, terminals, and computer programs to address the problem of complicated programming and processing operations in the prior art. For example, some embodiments include a graphical programming method, characterized in that it comprises: in a first interface, displaying a programming flowchart matching a target task to be executed, wherein the programming flowchart comprises at least two function blocks used for implementing the target task, and the first interface is used for configuring the function blocks in the programming flowchart and an execution logic between the function blocks; determining a first function block and a second function block from the programming flowchart, wherein the first function block is used for obtaining at least two pieces of first information to be processed, different pieces of first information correspond to different information processing results, and the second function block is used for obtaining information processing results corresponding to the first information; and configuring a first control between the first function block and the second function block, wherein the first control is used for determining a current information processing result according to the first information currently detected from the first function block and transmitting the current processing result to the second function block.

In some embodiments, determining a first function block and a second function block from the programming flowchart comprises: obtaining attribute description information corresponding to each function block in the programming flowchart, wherein the attribute description information is used for describing an attribute of information to be processed in a function block; determining a function block whose attribute description information indicates that it comprises at least two pieces of information as the first function block; obtaining a first result type of the information processing results corresponding to the first information to be processed in the first function block; and searching the function blocks for a function block corresponding to the first result type as the second function block matching the first function block.

In some embodiments, configuring a first control between the first function block and the second function block comprises: creating the first control in the first interface; and connecting an input end of the first control to the first function block, and connecting an output end of the first control to the second function block.

In some embodiments, creating the first control in the first interface comprises: obtaining optional branches matching the first function block and an output result corresponding to each optional branch through guide information, wherein the number of the pieces of first information to be processed in the first function block is consistent with the number of optional branches set in the first control, and each of the output results comprises an information processing result configured for each of the pieces of first information; and creating the first control according to the optional branches and the output results.

In some embodiments, obtaining optional branches matching the first function block through guide information comprises: obtaining an image comprising a plurality of objects to be processed; identifying object information for each object from the image; and grouping the identified object information to obtain at least two pieces of first information, wherein each of the optional branches corresponds to one piece of first information.

In some embodiments, obtaining an output result corresponding to each optional branch through guide information comprises: in a second interface associated with the first interface, displaying input prompt information corresponding to each of the optional branches, wherein the second interface is used for obtaining an information processing result configured for the first information; and according to the input prompt information, obtaining information processing results corresponding to the optional branches as the output results of the optional branches.

In some embodiments, creating the first control in the first interface comprises: automatically generating the corresponding first control in the first interface according to the number of the pieces of first information to be processed in the first function block, wherein the number of optional branches set in the first control is consistent with the number of the pieces of first information; and in each optional branch of the first control, respectively configuring the information processing result corresponding to each of the pieces of first information as an output result of the optional branch.

In some embodiments, before automatically generating the corresponding first control in the first interface according to the number of the pieces of first information to be processed in the first function block, it further comprises: obtaining an image comprising a plurality of objects to be processed; identifying object information for each object from the image; and determining at least two pieces of first information according to the identified object information.

In some embodiments, in each optional branch of the first control, respectively configuring the information processing result corresponding to each of the pieces of first information as an output result of the optional branch comprises: displaying a list of candidate results matching the first control, wherein the list of candidate results comprises the information processing results respectively corresponding to each of the pieces of first information; determining target information processing results corresponding to the first information currently to be configured from the candidate result list; obtaining a drag instruction generated by performing a drag operation on the target information processing results; and in response to the drag instruction, dragging the target information processing results into the output results corresponding to the first information.

In some embodiments, after configuring a first control between the first function block and the second function block, it further comprises: obtaining a first operation performed on the first control; adjusting the first control to a disabled state in response to the first operation, wherein the disabled state is used to indicate that the first control is suspended from running; or obtaining a second operation performed on the first control; adjusting the first control to an enabled state in response to the second operation, wherein the enabled state is used to indicate that the first control is restored for running.

As another example, some embodiments include a processor, characterized in that the processor is used to run a program, wherein the program, when running, executes one or more of the methods as described herein.

As another example, some embodiments include a terminal, characterized in that it comprises: one or more processors, a memory, and one or more programs, wherein the one or more programs are stored in the memory, and are configured to be executed by the one or more processors, and the one or more programs comprise one or more of the methods described herein.

BRIEF DESCRIPTION OF THE DRAWINGS

The drawings for the description that constitute part of the present application are used to provide further understanding. The exemplary embodiments and their description are used to explain the teachings of the present disclosure and do not constitute an limitation to the scope thereof. In the drawings.

Figure 1:
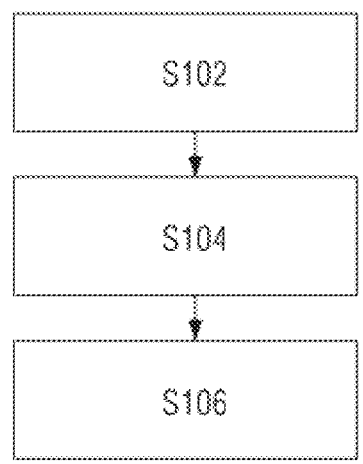
FIG. 1 is a flowchart of an optional graphical programming method incorporating teachings of the present disclosure.

The above drawings include the following reference numerals:

S102: in a first interface, displaying a programming flowchart matching a target task to be executed, wherein the programming flowchart comprises at least two function blocks used for implementing the target task, and the first interface is used for configuring the function blocks in the programming flowchart and an execution logic between the function blocks;

S104: determining a first function block and a second function block from the programming flowchart, wherein the first function block is used for obtaining at least two pieces of first information to be processed, different first information corresponds to different information processing results, and the second function block is used for obtaining information processing results corresponding to the first information;

S106: configuring a first control between the first function block and the second function block, wherein the first control is used for determining a current information processing result according to the first information currently detected from the first function block and transmitting the current processing result to the second function block.

S202: triggering the start of the task in the programming flowchart;

S204: executing the processing action in FB-1;

S206: executing the processing action in FB-2;

S208: executing the processing action in FB-3;

S210: executing the processing action in FB-4;

S212: executing the processing action in FB-5;
S214: executing the processing action in FB-6;
S216: completing the task.
30: first control;
31: object;
32: object.
40: dimension;
41: dimension;
42: dimension;
43: dimension;
44: dimension;
45: dimension;
46: image displaying region;
46-1: scissors;
46-2: battery;
46-3: circle object;
46-4: rectangular object;
S402: adding an image obtained after photographing.
S502: performing object identification on the image.
60: region;
61: round object;
62: rectangular object.
70: group adding region;
71: object adding region;
72: information configuration region.
80: object;
81: object;
82: object.
100: collaboration system interface;
101: input box;
102: input box.
110: first control;
111: information;
112: information.
120: selection region;
121: confirmation region.
130: object;
131: object.
140: first control;
S1402: configuring the first information of the first control connected to FB-2.
150: trigger key;
151: first control;
152: optional branch;
153: output box;
154: list of candidate results.
160: hatched region.
180: first control.
190: first control.

DETAILED DESCRIPTION

Some embodiments of the teachings herein include a method comprising: in a first interface, a programming flowchart matching a target task to be executed is displayed, wherein the programming flowchart comprises at least two function blocks used for implementing said target task, and the first interface is used for configuring the function blocks in the programming flowchart and an execution logic between the function blocks; a first function block and a second function block are determined from the programming flowchart, wherein the first function block is used for obtaining at least two pieces of first information to be processed, different pieces of first information correspond to different information processing results, and the second function block is used for obtaining information processing results corresponding to said first information; and a first control is configured between the first function block and the second function block, wherein the first control is used for determining a current information processing result according to the first information currently detected from the first function block and transmitting the current processing result to the second function block. In this way, the first control is used to realize the reuse of the first function block and the second function block, so that at least two pieces of first information that perform the same processing action can be used to complete application programming through the first control, without the need to configure different programming flowcharts for different pieces of first information, thereby achieving the purpose of simplifying the operation of application programming. Further, directly programming and configuring the graphically displayed function blocks and their execution logic in the first interface will also help to complete the programming and configuration process for application scenarios from the user's perspective, and assist novice engineers to more easily complete the application programming process, thus achieving the effect of reducing the complexity and time cost of programming operations.

In some embodiments, determining a first function block and a second function block from the programming flowchart comprises: obtaining attribute description information corresponding to each function block in the programming flowchart, wherein the attribute description information is used for describing an attribute of information to be processed in a function block; determining a function block whose attribute description information indicates that it comprises at least two pieces of information as the first function block; obtaining a first result type of the information processing results corresponding to the first information to be processed in the first function block; and searching the function blocks for a function block corresponding to the first result type as the second function block matching the first function block. In this way, the first function block and the second function block in the programming flowchart are determined according to the attribute description information of each function block in the programming flowchart, so as to quickly determine the first function block and the second function block to be reused from a plurality of function blocks, thereby shortening the time for creating the first control between the first function block and the second function block, and thus achieving the purpose of improving programming efficiency.

In some embodiments, configuring a first control between the first function block and the second function block comprises: creating the first control in the first interface; connecting an input end of the first control to the first function block, and connecting an output end of the first control to the second function block. In this way, after the first function block and the second function block are determined from the programming flowchart, the first control is created between the two, so as to realize the reuse of the function blocks based on the first control, without the need to establish a plurality of complex process information chains, thereby simplifying the programming process and programming operations, and thus achieving the effect of reducing the complexity of programming operations.

In some embodiments, creating the first control in the first interface comprises: obtaining optional branches matching the first function block and an output result corresponding to each optional branch through guide information, wherein the number of the pieces of first information to be processed in the first function block is consistent with the number of optional branches set in the first control, and each of the output results comprises an information processing result configured for each of the pieces of first information; and creating the first control according to the optional branches and the output results. In this way, optional branches matching the first function block and the output result corresponding to each optional branch are obtained through guide information, thereby assisting novice engineers to complete the graphical programming process in the first interface step by step through guide information, and to configure a programming flowchart corresponding to the target task, thus achieving the purpose of reducing the complexity of programming operations. Further, on the premise of simplifying the programming process, it will help to expand the scope of application of the graphical programming tool, making it suitable for more scenarios.

In some embodiments, obtaining optional branches matching the first function block through guide information comprises: obtaining an image comprising a plurality of objects to be processed; identifying object information of each object from the image; grouping the identified object information to obtain at least two pieces of first information, wherein each of the optional branches corresponds to one piece of first information. In this way, after the object information of each object is identified from the obtained image, it is grouped to obtain a plurality of pieces of first information, so that each piece of first information can be used as an optional branch in the first control to achieve the purpose of creating the first control based on guide information, thereby guiding the user to create the first control based on the guide information, simplify the creation process, and facilitating novice engineers to understand and use the programming tool.

In some embodiments, obtaining an output result corresponding to each optional branch through guided information comprises: in a second interface associated with the first interface, displaying input prompt information corresponding to each of the optional branches, wherein the second interface is used for obtaining an information processing result configured for the first information; and according to the input prompt information, obtaining information processing results corresponding to the optional branches as the output results of the optional branches. In this way, according to the input prompt information corresponding to each optional branch, the information processing result corresponding to each optional branch is obtained as the corresponding output result to create the first control, so that the first function block can be reused directly by use of the first control in subsequent application programming to achieve the purpose of efficiently processing different pieces of first information therein.

In some embodiments, creating the first control in the first interface comprises: automatically generating the corresponding first control in the first interface according to the number of the pieces of first information to be processed in the first function block, wherein the number of optional branches set in the first control is consistent with the number of the pieces of first information; and in each optional branch of the first control, respectively configuring the information processing result corresponding to each of the pieces of first information as an output result of the optional branch. In this way, the first control is created based on the object information of the objects already registered and identified and the configured information processing results. Thus, the graphical programming process can be quickly completed in the first interface, to configure a programming flowchart corresponding to the target task, thereby achieving the purpose of reducing the complexity of programming operations. Further, on the premise of simplifying the programming process, it will help to expand the scope of application of the graphical programming tool, making it suitable for more scenarios.

In some embodiments, automatically generating the corresponding first control in the first interface according to the number of the pieces of first information to be processed in the first function block further comprises: obtaining an image comprising a plurality of objects to be processed; identifying object information of each object from the image; determining at least two pieces of first information according to the identified object information. In this way, a plurality of pieces of first information are directly obtained through the results after object identification, so that each piece of first information can be used as an optional branch in the first control to achieve the purpose of automatically creating the first control, thereby simplifying the creation process, and facilitating novice engineers to understand and use the programming tool.

In some embodiments, in each optional branch of the first control, respectively configuring the information processing result corresponding to each of the pieces of first information as an output result of the optional branch comprises: displaying a list of candidate results matching the first control, wherein the list of candidate results comprises the information processing results respectively corresponding to each of the pieces of first information; determining target information processing results corresponding to the first information currently to be configured from the candidate result list; obtaining a drag instruction generated by performing a drag operation on the target information processing results; and in response to the drag instruction, dragging the target information processing results into the output results corresponding to the first information. In this way, the information processing result corresponding to each optional branch is obtained by a drag operation, which will be used as the corresponding output result to create the first control, so that the first function block can be reused directly by use of the first control in subsequent application programming to achieve the purpose of efficiently processing different pieces of first information therein.

In some embodiments, after configuring the first control between the first function block and the second function block, the method further comprises: obtaining a first operation performed on the first control; adjusting the first control to a disabled state in response to the first operation, wherein the disabled state is used to indicate that the first control is suspended from running; or obtaining a second operation performed on the first control; adjusting the first control to an enabled state in response to the second operation, wherein the enabled state is used to indicate that the first control is restored for running. In this way, through the application programming interface, the running state of the first control and its optional branches can also be directly adjusted, thereby achieving the purpose of improving control flexibility.

In some embodiments, a processor is used to run a program, wherein the program, when running, executes one or more of the methods described herein.

In some embodiments, a terminal comprises: one or more processors, a memory, and one or more programs, wherein the one or more programs are stored in the memory, and are configured to be executed by the one or more processors, and the one or more programs comprise instructions for executing one or more of the methods described herein.

In some embodiments, a computer program product is tangibly stored in a computer readable medium and comprises a computer executable instruction that, when executed, causes at least one processor to execute one or more of the methods described herein.

By applying the teachings of the present disclosure, through providing a graphical programming method, after displaying the programming flowchart matching a target task to be executed in a first interface, a first function block and a second function block are determined from the programming flowchart, wherein the programming flowchart comprises at least two function blocks, the first function block determined above is used for obtaining at least two pieces of first information to be processed, and different first information corresponds to different information processing results. The second function block is used for obtaining the information processing results corresponding to the first information. Subsequently, a first control is configured between the first function block and the second function block, the first control is used for determining a current information processing result according to the first information currently detected from the first function block and transmitting the current processing result to the second function block. And then the results after further processing are transmitted to subsequent function blocks in the programming flowchart, thereby completing the target task.

That is, the first control may be used to realize the reuse of the first function block and the second function block, so that at least two pieces of first information that perform the same processing action can be used to complete application programming through the first control, without the need to configure different programming flowcharts for different pieces of first information, thereby achieving the purpose of simplifying the operation of application programming. Further, directly programming and configuring the graphically displayed function blocks and their execution logic in the first interface will also help to complete the programming and configuration process for application scenarios from the user's perspective, and assist novice engineers to more easily complete the application programming process, thus achieving the effect of reducing the complexity and time cost of programming operations.

DETAILED DESCRIPTION

It should be noted that the embodiments in the present application and the features in the embodiments can be combined if there is no conflict. The teachings of the present disclosure are described in detail below with reference to the drawings and in conjunction with example embodiments. It should be noted that, unless otherwise indicated, all the technical and scientific terms used in the present application have the same meaning as commonly understood by those skilled in the art.

Some embodiments include a graphical programming method. In some embodiments, as shown in FIG. 1, the graphical programming method may perform the following steps without limitation:

S102, in a first interface, displaying a programming flowchart matching a target task to be executed, wherein the programming flowchart comprises at least two function blocks used for implementing the target task, and the first interface is used for configuring the function blocks in the programming flowchart and an execution logic between the function blocks;

S104, determining a first function block and a second function block from the programming flowchart, wherein the first function block is used for obtaining at least two pieces of first information to be processed, different first information corresponds to different information processing results, and the second function block is used for obtaining information processing results corresponding to the first information; and S106, configuring a first control between the first function block and the second function block, wherein the first control is used for determining a current information processing result according to the first information currently detected from the first function block and transmitting the current processing result to the second function block.

In some embodiments, the graphical programming method may be applied to without limitation a computer programming tool, and the function blocks required in executing a target task and the logic between the function blocks are configured through a human-computer interaction interface provided in the computer programming tool. The interaction interface may be, but is not limited to, a channel for information exchange between humans and computers. Users input information to a computer and perform operations through the interaction interface, while the computer provides information to the user through the interaction interface for reading, analysis and decision making. In addition, each function block (FB) in this embodiment will be presented in the human-computer interaction interface in a graphical form, so that the application programming process for a target task can be completed directly through configuration operations on the human-computer interaction interface. Specifically, each of the function blocks is respectively integrated with a set of program instructions in application programming, and the set of program instructions is used to perform a processing action.

Figure 2:
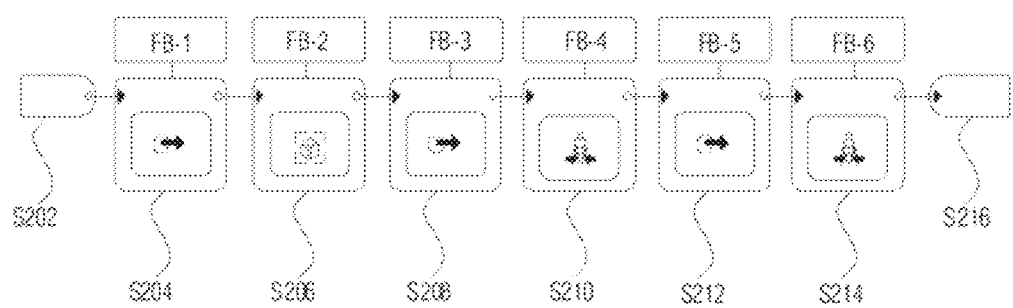
FIG. 2 is a schematic diagram of the programming flowchart of an optional graphical programming method incorporating teachings of the present disclosure.

For example, in the first interface as shown in FIG. 2, a plurality of function blocks required to implement a target task can be configured. For example, the programming flowchart shown in FIG. 2 includes at least six function blocks, which are in sequence: FB-1 for moving an object to the shooting position, FB-2 for obtaining the sorting position of an object, FB-3 for moving to the shooting position, FB-4 for grabbing an object, FB-5 for moving an object to the position of the box to be released, and FB-6 for releasing an object. For example, as shown in FIG. 2, the corresponding actions in the programming flowchart are executed sequentially through the various function blocks above, for example, S202, triggering the start of the task in the programming flowchart; S204-S214, executing the processing actions in FB-1 to FB-6, and finally, S216, completing the task. The above is an example, and this embodiment is not limiting.

It should be noted that, In this embodiment, after displaying the programming flowchart matching a target task to be executed in a first interface, a first function block and a second function block are determined from the programming flowchart, wherein the programming flowchart comprises at least two function blocks, the first function block determined above is used for obtaining at least two pieces of first information to be processed, and different first information corresponds to different information processing results. The second function block is used for obtaining the information processing results corresponding to the first information.

Subsequently, a first control is configured between the first function block and the second function block, the first control is used for determining a current information processing result according to the first information currently detected from the first function block and transmitting the current processing result to the second function block. And then the results after further processing are transmitted to subsequent function blocks in the programming flowchart, thereby completing the target task. That is, in this embodiment, the first control is used to realize the reuse of the first function block and the second function block, so that at least two pieces of first information that perform the same processing action can be used to complete application programming through the first control, without the need to configure different programming flowcharts for different pieces of first information, thereby achieving the purpose of simplifying the operation of application programming. Further, directly programming and configuring the graphically displayed function blocks and their execution logic in the first interface will also help to complete the programming and configuration process for application scenarios from the user's perspective, and assist novice engineers to more easily complete the application programming process, thus achieving the effect of reducing the complexity and time cost of programming operations.

In some embodiments, determining a first function block and a second function block from the programming flowchart comprises but is not limited to: obtaining attribute description information of each function block; determining a function block having at least two pieces of information to be processed according to the attribute description information, and taking it as the first function block; obtaining a first result type of the information processing results of the first information in the first function block, and determining the second function block matching the first function block according to the first result type.

It should be noted that, in this embodiment, the attribute description information may be without limitation used to indicate the type and quantity of information to be processed in a function block. When the number of pieces of information is at least two, it means that the function block will be reused, and the function block may be determined as the first function block. Further, the result type of the information processing result after the function block processes the information is obtained, and another function block using the result type from the function blocks following the first function block is determined as the second function block matching the first function block.

In some embodiments, the first control may include without limitation a conditional selection control (for example, Switch) for selecting and processing different information to be processed. Through the first control, the corresponding information processing result can be selected and determined directly according to the matching relationship based on the detected current input information.

Figure 3:
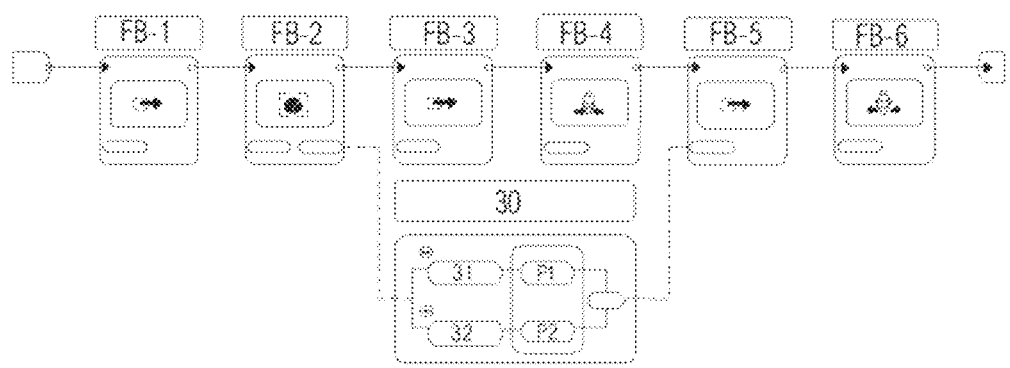
FIG. 3 is a schematic diagram of the programming flowchart of another optional graphical programming method incorporating teachings of the present disclosure.

For example, as shown in FIG. 3, assume that the programming flowchart shown in FIG. 2 is still taken as an example. In FB-2, it is determined that the two pieces of first information to be moved include: object 31 (abbreviated as Obj_1) and object 32 (abbreviated as Obj_2), and then FB-2 can be determined as the first function block. Then it is determined that the information processing result processed by the first function block is the release position. For example, object 31 (abbreviated as Obj_1) corresponds to position 1 (abbreviated as P1), and object 32 (abbreviated as Obj_2) corresponds to position 2 (abbreviated as P2). Thus, FB-5 used to obtain the release position can be determined as the second function block. Then the first control is configured between FB-2 and FB-5. As shown in FIG. 3, the input end of the first control 30 is connected to FB-2, and the output end is connected to FB-5, wherein the mapping relationships between two pieces of first information and the information processing results (i.e., the mapping relationship between object 31 and position P1, and the mapping relationship between object 32 and position P2) are recorded in the first control 30.

In some embodiments, the first control may be created in one of the following ways, without limitation:
1) Guiding the user to create the first control through guide information. For example, the user is guided to determine each optional branch and the corresponding output result of each optional branch. The number of optional branches is consistent with the number of the pieces of first information to be processed in the first function block, and the output result comprises the information processing result; then the optional branches and the output results are used to create the first control;
2) Automatically creating the first control according to the first information to be processed obtained in advance. For example, the first control is automatically generated according to the number of the pieces of first information obtained in advance, where the number of optional branches in the first control is consistent with the number of the pieces of first information; and then the output results are configured for the first control, and the output results include information processing results.

In some embodiments, the output results of the first control (i.e., the result types of the information processing results) may include but are not limited to: the position coordinates of the moving position, moving path, storage path for reading and writing data, modified data content or value, etc. It is an example here, and this embodiment is not limiting. In some embodiments, different first controls can be created flexibly, so as to realize more efficient reuse of function blocks, thereby achieving the effect of improving the efficiency of using function blocks in programming.

In some embodiments, the first control is used to realize the reuse of the first function block and the second function block, so that at least two pieces of first information that perform the same processing action can be used to complete application programming through the first control, without the need to configure different programming flowcharts for different pieces of first information, thereby achieving the purpose of simplifying the operation of application programming. Further, directly programming and configuring the graphically displayed function blocks and their execution logic in the first interface will also help to complete the programming and configuration process for application scenarios from the user's perspective, and assist novice engineers to more easily complete the application programming process, thus achieving the effect of reducing the complexity and time cost of programming operations.

In some embodiments, determining a first function block and a second function block from the programming flowchart comprises:
S1, obtaining attribute description information corresponding to each function block in the programming flowchart, wherein the attribute description information is used for describing an attribute of information to be processed in a function block;
S2, determining a function block whose attribute description information indicates that it comprises at least two pieces of information as the first function block;
S3, obtaining a first result type of the information processing results corresponding to the first information to be processed in the first function block; and S4, searching the function blocks for a function block corresponding to the first result type as the second function block matching the first function block.

In some embodiments, each function block in the programming flowchart may be without limitation configured with the corresponding attribute description information, and the attributes of the information described in the attribute description information may include without limitation the following: the type of information, quantity of information, size of the object indicated by the information, weight of the object indicated by the information, etc. For example, assuming that the current target task is an item delivery task and the object indicated by the information here is an item to be delivered, the plurality of function blocks comprised in the programming flowchart for implementing the item delivery task here will control machinery equipment (for example, robots or robotic arms) through the programming program to coordinate and complete the task.

For example, in this scenario, the plurality of function blocks may include: a function block FB-1 for taking images of the item to be delivered; a function block FB-2 for obtaining the position of the sorting table where the item is located, a function block FB-3 for moving the item to the sorting table, a function block FB-4 for grabbing the item, a function block FB-5 for moving the item to the position of the packing box, and a function block FB-6 for releasing the item. Further, when it is recognized through the image that there are at least two items to be delivered, the information corresponding to the function block FB-2 that can be used to obtain the position of an item on the sorting table includes at least two pieces of the information, corresponding to the two items respectively. Then FB-2 is determined as the first function block, it is then determined that each item will be placed in a different packing box, and the function block FB-5 that can be used to move an item to the location of the packing box is determined as the second function block.

In some embodiments, the first function block and the second function block in the programming flowchart are determined according to the attribute description information of each function block in the programming flowchart, so as to quickly determine the first function block and the second function block to be reused from a plurality of function blocks, thereby shortening the time for creating the first control between the first function block and the second function block, and thus achieving the purpose of improving programming efficiency.

In some embodiments, configuring a first control between the first function block and the second function block comprises:

S1, creating the first control in the first interface; and
S2, connecting an input end of the first control to the first function block, and connecting an output end of the first control to the second function block.

In some embodiments, the first control may be without limitation a conditional selection control having optional branches, for example, Switch. It should be noted that optional branches for the first control may be set according to the type of information, or to the quantity of information. An example will be used in the description below with the optional branches in the first control created based on the quantity of information.

For example, as shown in FIG. 3, assuming that the number of the pieces of first information is 2, a first control can be created, which includes two optional branches object 31 (abbreviated as Obj_1) and object 32 (abbreviated as Obj_2). If the currently detected information is object 31, the first branch will be selected; if the currently detected information is object 32, the second branch will be selected. Further, the information processing result is configured for each optional branch, for example, configuring the information processing result P1 for object 31, and configuring information processing result P2 for object 32. It should be noted that the contents (for example, Value) of the output results of the two branches are different, but they are of the same result type, and both are used in the second function block.

After the first control is created, as shown in FIG. 3, the input end of the first control is connected to the first function block (for example, FB-2) for obtaining a plurality of pieces of information, and the output end of the first control is connected to the second function block (for example, FB-5) for obtaining the information processing results of the plurality of pieces of information.

In some embodiments, after the first function block and the second function block are determined from the programming flowchart, the first control is created between the two, so as to realize the reuse of the function blocks based on the first control, without the need to establish a plurality of complex process information chains, thereby simplifying the programming process and programming operations, and thus achieving the effect of reducing the complexity of programming operations.

In some embodiments, creating the first control in the first interface comprises:

S1, obtaining optional branches matching the first function block and an output result corresponding to each optional branch through guide information, wherein the number of the pieces of first information to be processed in the first function block is consistent with the number of optional branches set in the first control, and each of the output results comprises an information processing result configured for each of the pieces of first information; and
S2, creating the first control according to the optional branches and the output results.

In some embodiments, the guide information may be used, without limitation, to guide the user to input optional branches and the output result corresponding to each optional branch. Here, the number of optional branches is consistent with the number of the pieces of first information to be processed, so that each pieces of first information corresponds to one optional branch, and when a pieces of first information is detected, the output result in the corresponding optional branch can be obtained as the information processing result of the piece of first information.

In some embodiments, the optional branches matching the first function block may be obtained in the following way without limitation: grouping the objects to be processed in the target task according to the guide information, and taking the object information in one group as one piece of first information. That is, in this embodiment, the optional branches required in the first control are determined by grouping and configuring the objects. It should be noted that, in this embodiment, the objects to be processed may be determined by, without limitation, performing object identification in an image of an image acquisition device.

In some embodiments, the output results corresponding to the optional branches may be obtained in the following way without limitation: configuring the information processing results in each optional branch according to the guide information. For example, when the processing action of the first function block is to move a plurality of objects, the first information is used to indicate the objects in different groups, and the output results of each optional branch are used to indicate the moving paths or the positions after moving of the objects in the group. For another example, when the processing action of the first function block is to identify a plurality of objects, the first information is used to indicate the objects in different groups, and the output results of each optional branch are used to indicate the storage positions of the identification results of the objects in the group. It is an example here, and this embodiment does not make any limitation thereto.

In some embodiments, optional branches matching the first function block and the output result corresponding to each optional branch are obtained through guide information, thereby assisting novice engineers to complete the graphical programming process in the first interface step by step through guide information, and to configure a programming flowchart corresponding to the target task, thus achieving the purpose of reducing the complexity of programming operations. Further, on the premise of simplifying the programming process, it will help to expand the scope of application of the graphical programming tool, making it suitable for more scenarios.

In some embodiments, obtaining optional branches matching the first function block through guide information comprises:

S1, obtaining an image comprising a plurality of objects to be processed;

S2, identifying object information for each object from the image; and

S3, grouping the identified object information to obtain at least two pieces of first information, wherein each of the optional branches corresponds to one piece of first information.

Optionally, in this embodiment, an image of a plurality of objects to be processed on a production line may be acquired by, without limitation, an image acquisition device. Here, the image may be but is not limited to a global image comprising a plurality of objects. In addition, the image acquisition device in this embodiment may be but is not limited to cameras installed at different positions on a production line. The cameras here may be different type of cameras, for example, ordinary cameras, infrared night vision cameras, etc., which are not limited by this embodiment.

Figure 4:
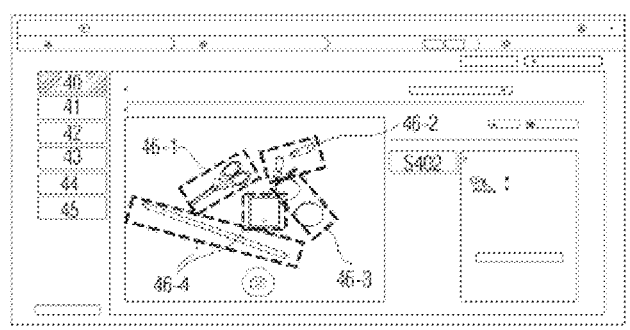
FIG. 4 is a schematic diagram of the programming flowchart of an optional graphical programming method incorporating teachings of the present disclosure.
Figure 5:
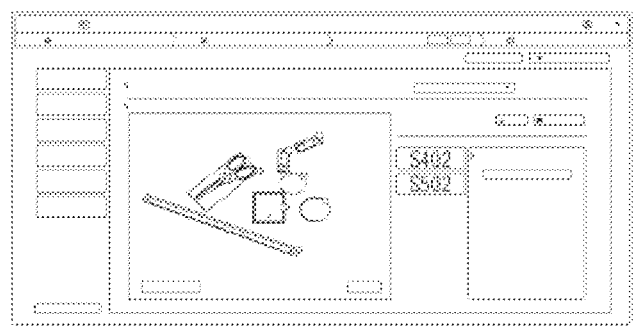
FIG. 5 is a schematic diagram of the programming flowchart of another optional graphical programming method incorporating teachings of the present disclosure.

Specifically, the following example is used for description: in the application programming tool, a programming configuration interface is displayed, which comprises at least the following tabs: a project setting tab (for example, Project Settings) for configuring the task information of a target task, a system configuration tab (for example, System Configuration) for configuring the relevant information of the operating equipment that performs the target task, an application programming tab (for example, Application Programming) for configuring the execution logics of the function blocks, and a simulation tab for simulating the completion of the programming. Further, the following programming configuration processes, without limitation, may be performed in the application programming tab (i.e., the first interface):

It is assumed that the guide information here may include without limitation 6 dimensions as shown in the left sidebar of FIG. 4, for example, dimension 40 to dimension 45. Here, in the angle of view detection dimension (i.e., dimension 40), the objects to be processed for the target task can be photographed by the cameras. As in step S402, an image obtained after photographing is added, and the image may have the contents shown in the image displaying region 46 as shown in the middle of FIG. 4, which includes seven objects, namely: scissors 46-1, battery 46-2, circle object 46-3, and rectangular object 46-4. Then in step S502 as shown in FIG. 5, object identification is performed on the image, to obtain the object information of each object, for example, identifying the appearance shape of each object: five rectangles of different sizes and two circles.

Figure 6:
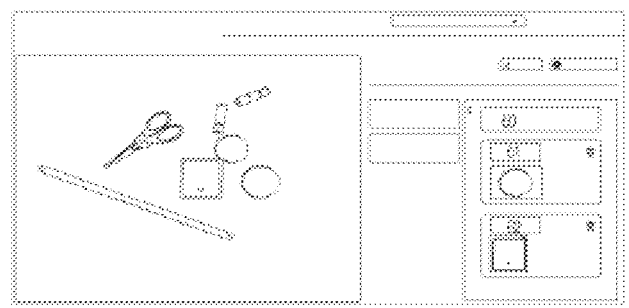
FIG. 6 is a schematic diagram of the programming flowchart of another optional graphical programming method incorporating teachings of the present disclosure.

Further, each appearance shape is selected in turn as shown in FIG. 6, and object registration is performed on the appearance shapes. The registration result is shown in the region 60 on the right side of FIG. 6: one circular object is registered as "61", and as shown in the figure, the registration result includes the appearance shape and registration name of the circular object. One rectangular object is registered as "62", and as shown in the figure, the registration result includes the appearance shape and registration name of the circular object. It should be noted that the registration name here can be user defined, and the registered objects here can also be manually deleted.

Figure 7:
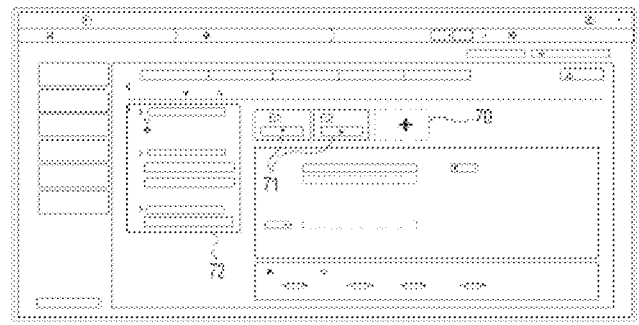
FIG. 7 is a schematic diagram of the programming flowchart of another optional graphical programming method incorporating teachings of the present disclosure.
Figure 8:
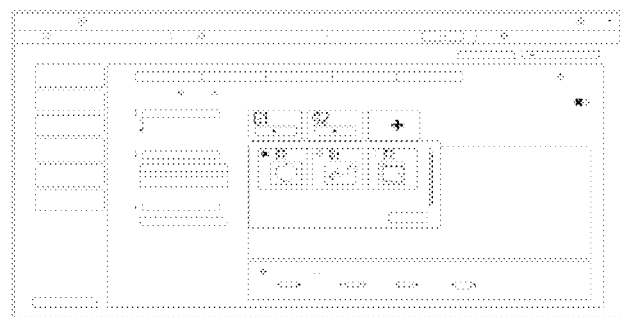
FIG. 8 is a schematic diagram of the programming flowchart of another optional graphical programming method incorporating teachings of the present disclosure.
Figure 9:
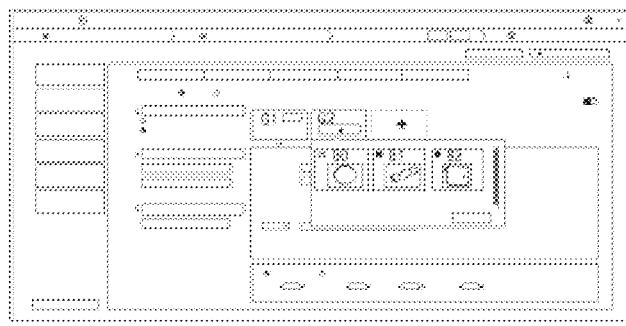
FIG. 9 is a schematic diagram of the programming flowchart of another optional graphical programming method incorporating teachings of the present disclosure.

Then, in the dimension of determining the path of moving to a location, the identified and registered objects can be grouped, and the grouping interface may be as shown in FIGS. 7 to 9:

As shown in FIG. 7, at least two established groups will be displayed by default, for example, Group 1 (G1 as shown in the figure) and Group 2 (G2 as shown in the figure). It is also possible to add a new group (Add Group) by performing a click operation in the group adding region 70. In addition, it is also possible to directly add objects (Select Object) for each group, for example, performing a click operation in the object adding region 71, to add new objects here for G1 or G2, where the source of the new objects is the identified and registered objects described above. Other information associated with the group may also be configured in the information configuration region 72 as shown in FIG. 7.

Assuming that the identified and registered objects include "80", "81" and "82", as shown in FIG. 8, object "80" is added to group 1 (G1), and as shown in FIG. 9, objects "81" and "82" are added to group 2 (G2). Accordingly, group 1 (G1) may be used as a pieces of first information in the first function block, and group 2 (G2) may be used as another piece of first information in the first function block. Here, each piece of first information will correspond to a different optional branch.

In some embodiments, after the object information of each object is identified from the obtained image, it is grouped to obtain a plurality of pieces of first information, so that each piece of first information can be used as an optional branch in the first control to achieve the purpose of creating the first control based on guide information, thereby guiding the user to create the first control based on the guide information, simplify the creation process, and facilitating novice engineers to understand and use the programming tool.

As an optional solution, obtaining an output result corresponding to each optional branch through guide information comprises: S1, in a second interface associated with the first interface, displaying input prompt information corresponding to each of the optional branches, wherein the second interface is used to obtain an information processing result configured for the first information; and S2, according to the input prompt information, obtaining information processing results corresponding to the optional branches as the output results of the optional branches.

In some embodiments, the second interface may be a sub-interface comprised in the first interface, or an interface that jumps after performing an operation on a function key in the first interface. In this embodiment, no limitation is made thereto. The description will continue still taking the scenario assumed in the above embodiment.

Figure 10:
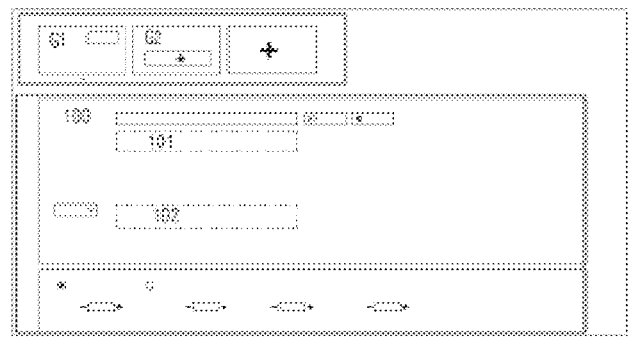
FIG. 10 is a schematic diagram of the programming flowchart of another optional graphical programming method incorporating teachings of the present disclosure.

Here, the configuration output result of group 1 (G1) is taken as an example. As shown in FIG. 10, the input prompt information is displayed in the pull-down interface (collaboration system interface) 100 of group 1 (G1) to prompt the user to input the information processing result corresponding to group 1 (G1). After the information processing result of group 1 (G1) is obtained, it is used as the output result of the optional branch corresponding to group 1 (G1). For example, input of object information is prompted in input box 101, and input of placement position P1 is prompted in input box 102. Further, to configure the output results for group 2 (G2), the pull-down interface (collaboration system interface) of group 2 (G2) can be switched to. The above embodiment can be referred to for the configuration process, which will not be repeated in this embodiment.

Figure 11:
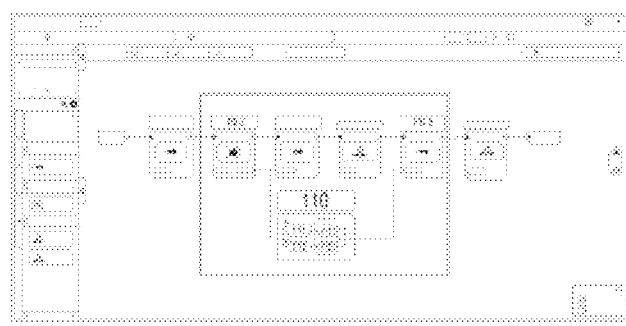
FIG. 11 is a schematic diagram of the programming flowchart of another optional graphical programming method incorporating teachings of the present disclosure.

After the output results of each optional branch are configured, the created first control 110 can be obtained, with the result as shown in FIG. 11. The first control comprises two optional branches, wherein the result corresponding to information 111 is P1, the result corresponding to information 112 is P2, and the input end and the output end of the first control have respectively established information transfer connections with FB-2 and FB-5 in the programming flowchart.

Figure 12:
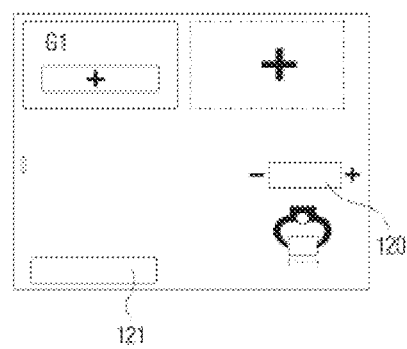
FIG. 12 is a schematic diagram of the programming flowchart of another optional graphical programming method incorporating teachings of the present disclosure.

In addition, assuming that the objects in group 1 (G1) in this example are used for executing a grabbing action, as shown in FIG. 12, the width of the grabber can be configured, for example, by selecting the width value in the selection region 120, so that it matches the width of the objects in group 1 (G1), and then the confirmation operation performed in the confirmation region 121 is obtained.

In some embodiments, according to the input prompt information corresponding to each optional branch, the information processing result corresponding to each optional branch is obtained as the corresponding output result to create the first control, so that the first function block can be reused directly by use of the first control in subsequent application programming to achieve the purpose of efficiently processing different pieces of first information therein.

In some embodiments, creating the first control in the first interface comprises:
S1, automatically generating the corresponding first control in the first interface according to the number of the pieces of first information to be processed in the first function block, wherein the number of optional branches set in the first control is consistent with the number of the pieces of first information; and
S2, in each optional branch of the first control, respectively configuring the information processing result corresponding to each of the pieces of first information as an output result of the optional branch.

In some embodiments, the first control may also be automatically generated according to the object information of the registered objects. For example, the first control can be automatically generated according to the number of registered objects (or the grouping results), so that the number of registered objects is consistent with the number of the optional branches in the first control. Then, the information processing result of each object is obtained, as the output result corresponding to each optional branch.

In some embodiments, the first control is created based on the object information of the objects already registered and identified and the configured information processing results. Thus, the graphical programming process can be quickly completed in the first interface, to configure a programming flowchart corresponding to the target task, thereby achieving the purpose of reducing the complexity of programming operations. Further, on the premise of simplifying the programming process, it will help to expand the scope of application of the graphical programming tool, making it suitable for more scenarios.

In some embodiments, before automatically generating the corresponding first control in the first interface according to the number of the pieces of first information to be processed in the first function block, it further comprises:
S1, obtaining an image comprising a plurality of objects to be processed;
S2, identifying object information for each object from the image; and
S3, determining at least two pieces of first information according to the identified object information.

Specifically, the following example is used for description: assuming that the examples shown in FIGS. 4 and 5 are still used to obtain an image of a plurality of objects, the object information of each object is identified from the image. The process of image acquisition and image identification will not be repeated here.

Figure 13:
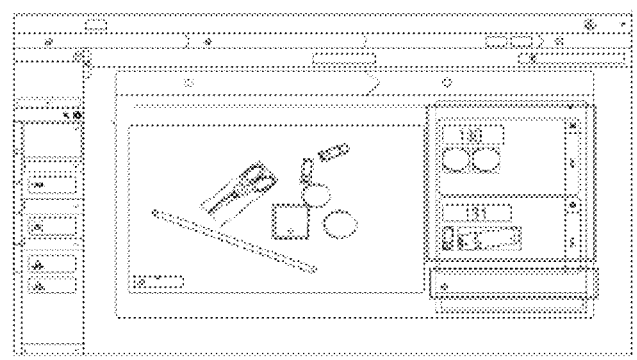
FIG. 13 is a schematic diagram of the programming flowchart of another optional graphical programming method incorporating teachings of the present disclosure.

Further, objects are selected therefrom for registration, and the registration result may be as shown in FIG. 13. The first object includes two circular appearance shapes, and is named "130"; the second object includes two batteries, and is named "131". It should be noted that the registration name here can be user defined, and the registered objects here can also be manually deleted.

Then each object is determined as different information in the first function block. For example, "130" is determined as a piece of first information in the first function block, and "131" as another piece of first information in the first function block. Here, each piece of first information will correspond to a different optional branch.

In some embodiments, a plurality of pieces of first information are directly obtained through the results after object identification, so that each piece of first information can be used as an optional branch in the first control to achieve the purpose of automatically creating the first control, thereby simplifying the creation process, and facilitating novice engineers to understand and use the programming tool.

In some embodiments, in the output result corresponding to the optional branches in the first control, configuring the information processing result corresponding to each of the pieces of first information comprised:
S1, displaying a list of candidate results matching the first control, wherein the list of candidate results comprises the information processing results respectively corresponding to each of the pieces of first information;
S2, determining target information processing results corresponding to the first information currently to be configured from the candidate result list;
S3, obtaining a drag instruction generated by performing a drag operation on the target information processing results; and
S4, in response to the drag instruction, dragging the target information processing results into the output results corresponding to the first information.

Figure 14:
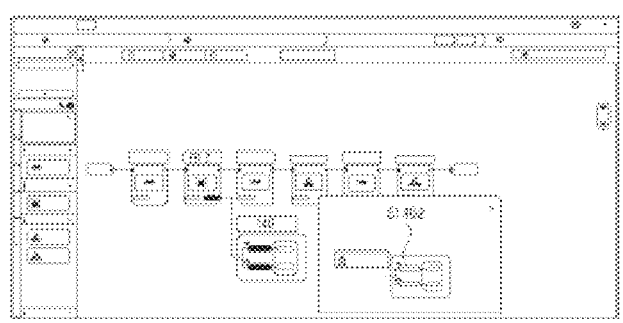
FIG. 14 is a schematic diagram of the programming flowchart of another optional graphical programming method incorporating teachings of the present disclosure.
Figure 15:
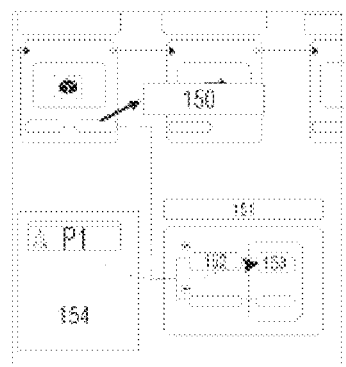
FIG. 15 is a schematic diagram of the programming flowchart of another optional graphical programming method incorporating teachings of the present disclosure.

Assuming that the currently determined first function block is FB-2 as shown in FIG. 14, in step S1402, firstly the first information (the hatched region in 140 in the figure) of the first control 140 connected to FB-2 is configured, and then the respective information processing result is further configured. As shown in FIG. 15, assume that the output result is currently being configured for the optional branch 152 of the first control "151". After a click operation performed on the trigger key 150 in FB-2 is obtained, a candidate result list 154 will be displayed, and after the output result P1 corresponding to 152 is determined, P1 is dragged to the output box 153 corresponding to 152.

Figure 16:
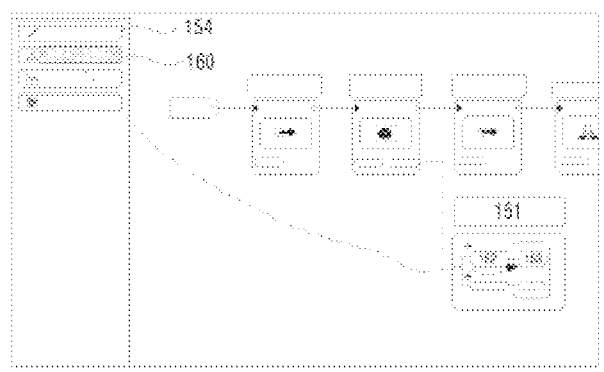
FIG. 16 is a schematic diagram of the programming flowchart of another optional graphical programming method incorporating teachings of the present disclosure.

Specifically, the candidate result list 154 may be the candidate result list shown in the left sidebar of FIG. 16, where the candidate result list 154 may comprise without limitation: paths, coordinates, data, and values. Then, after a target information processing result is determined from the candidate result list 154 (as shown by the hatched region 160 in FIG. 16), the target information processing result (for example, "coordinate position") is dragged to the drag instruction of the output box 154 corresponding to the output result in the first control 151, and in response to the drag instruction, the drag action is completed, and at the same time the target information processing result (for example, "coordinate position") is configured as the output result of the optional branch where 152 is located.

Figure 17:
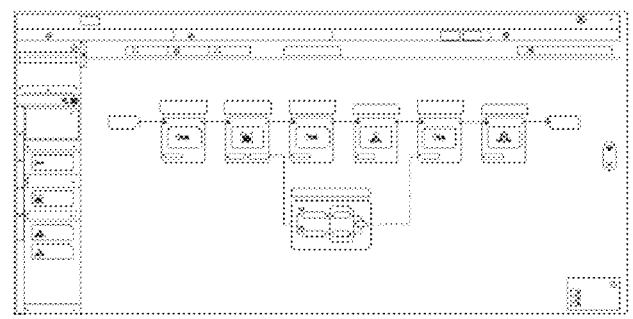
FIG. 17 is a schematic diagram of the programming flowchart of another optional graphical programming method incorporating teachings of the present disclosure.

After the output results of each optional branch are configured, the created first control can be obtained, with the result as shown in FIG. 17. The first control comprises two optional branches, and the input end and the output end of the first control have respectively established information transfer connections with the programming flowchart.

In some embodiments, the information processing result corresponding to each optional branch is obtained by a dragging operation, which will be used as the corresponding output result to create the first control, so that the first function block can be reused directly by use of the first control in subsequent application programming to achieve the purpose of efficiently processing different pieces of first information therein.

In some embodiments, after configuring a first control between the first function block and the second function block, it further comprises:
1) obtaining a first operation performed on the first control; adjusting the first control to a disabled state in response to the first operation, wherein the disabled state is used to indicate that the first control is suspended from running; or
2) obtaining a second operation performed on the first control; adjusting the first control to an enabled state in response to the second operation, wherein the enabled state is used to indicate that the first control is restored for running.

In some embodiments, the first control may also accept an operation for instructing the adjustment of the running state. For example, a first operation is used to instruct the adjustment of the running first control to the disabled state, and at the same time mark and display the first control in the disabled state; a second operation instructs the adjustment of the stopped first control to the enabled state, and at the same time restore the normal display of the first control that has resumed the enabled state.

Figure 18:
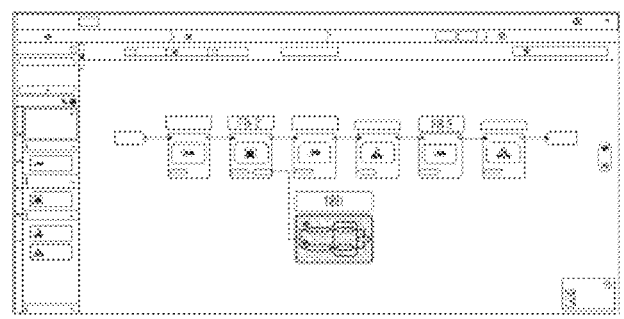
FIG. 18 is a schematic diagram of the programming flowchart of another optional graphical programming method incorporating teachings of the present disclosure.

It should be noted that the first operation here may be but is not limited to a click operation performed on the control key corresponding to the first control, for example, a short press operation, a long press operation, and a combination thereof. For example, a short press will switch the state; for another example, a short press is to resume operation, and a long press is to stop operation. It is an example here, and this embodiment is not limiting. For example, assuming that an adjustment instruction for instructing the adjustment of the running first control to a disabled state is obtained, the first control in the disabled state can be marked and displayed, as shown in FIG. 18, the display color of the first control 180 is adjusted (by a grid as shown in the figure), the connection between the first control 180 and the second function block FB-5 is disconnected, and the connection between the first control 180 and the first function block FB-2 is maintained.

Figure 19:
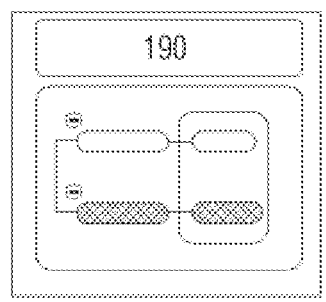
FIG. 19 is a schematic diagram of the programming flowchart of another optional graphical programming method incorporating teachings of the present disclosure.

In some embodiments, it is also possible, without limitation, to accept an operation for instructing the adjustment of the running state of any branch in the first control. Thus, the running state of each optional branch can be flexibly controlled. For example, assuming that an adjustment instruction for instructing the adjustment of the running second optional branch in the first control to a disabled state is obtained, as shown in FIG. 19, the second optional branch in the first control 190 in the disabled state may be marked and displayed, and the display color of the optional branch is adjusted (by a grid as shown in the figure).

In some embodiments, through the application programming interface, the running state of the first control and its optional branches can also be directly adjusted, thereby achieving the purpose of improving control flexibility. It should be noted that, for easy description, the above embodiments of the methods are described as a combination of a series of actions, but it should be understood by those skilled in the art is not limited by the sequence of the described actions, because some steps may be performed in other sequences or simultaneously. Furthermore, it should also be understood by those skilled in the art that, all the embodiments in the description are example embodiments, and the involved actions or modules are not necessarily required.

In addition, a memory may also be included, for storing software programs and modules, for example, program instructions/modules corresponding to the graphical programming methods described herein, and the processor runs the software programs and modules stored in the memory to execute various functional applications and data processing operations, i.e., to implement the graphical programming method described above. The memory may comprise a high-speed random access memory, and may also comprise a non-volatile memory, for example, one or more magnetic storage devices, flash memories, or other non-volatile solid-state memories. In some embodiments, the memory may further comprise memories located remotely from the processor, and these remote memories may be connected to terminals via a network. Examples of the network include but are not limited to the Internet, intranets, local area networks, mobile communication networks, and a combination thereof.

In some embodiments, a terminal for implementing the graphical programming methods described above is also provided, comprising: one or more processors, a memory, and one or more programs, wherein the one or more programs are stored in the memory, and are configured to be executed by the one or more processors, and the one or more programs comprise being used for executing the method described above. Optionally, those skilled in the art can understand that a terminal here may be a smart phone (for example, an Android phone, an iOS phone, etc.), a tablet, a pocket PC, a mobile Internet device (MID), a PAD, or other terminal devices.

In some embodiments, the terminal may be a node in a distributed system, wherein the distributed system may be a block chain system, and the block chain system may be a distributed system formed by connecting a plurality of nodes via network communication. Specifically, nodes may form a peer-to-peer (P2P) network, and any form of computing devices, for example, servers, terminals and other electronic devices, may become a node in the block chain system by joining the peer-to-peer network.

In some embodiments, a computer program product for implementing the graphical programming method described above is also provided, which is tangibly stored in a computer readable medium and comprises a computer executable instruction that, when executed, causes at least one processor to execute one or more of the methods described herein.

If an integrated unit in the above embodiments is implemented in the form of a functional unit of software and sold or used as an independent product, it may be stored in a computer-readable storage medium. Based on this understanding, the technical solution in essence, or the part that contributes to the prior art, or all or part of the technical solution may be embodied in the form of a software product, and the computer software product is stored in a storage medium, including several instructions to cause one or more computing devices (which may be a personal computer, a server, a network device, etc.) to execute all or part of the steps of the method described in the various embodiments of the present application.

The description of each embodiment is focused on some particulars. For parts that are not described in detail in a certain embodiment, reference may be made to the relevant descriptions of other embodiments. In the several embodiments provided in the present application, it should be understood that the disclosed client may be implemented in other manners. Specifically, the device embodiments described above are only illustrative. For example, the division of the units is only a logical functional division, and there may be other division methods in actual implementation, for example, with multiple units or components combined or integrated into another system, or with some features omitted, or not implemented. In another aspect, the coupling or direct coupling or communication connection shown or discussed may be implemented through indirect coupling or communication connection of some interfaces, units or modules, which may be electrical or in other forms.

The units described as separate components may or may not be physically separated, and the components displayed as units may or may not be physical units, i.e., they may be located in one place, or distributed to a plurality of network units. Some or all of the units may be selected depending on actual needs to achieve the purpose of the solution of this embodiment.

In addition, the functional units in each embodiment may be integrated into one processing unit, or each unit may exist physically alone, or two or more units may be integrated into one unit. The above integrated units may be implemented in the form of hardware, or may be implemented in the form of functional units of software.

The above are only example embodiments. It should be pointed out that those skilled in the art may make several improvements and modifications without departing from the principles of the present disclosure. These improvements and modifications shall be regarded as within the scope thereof.

What is claimed is:

1. A graphical programming method comprising:
    in a first interface, displaying a programming flowchart matching a target task to be executed, wherein the programming flowchart comprises at least two function blocks used for implementing the target task, and the first interface is used for configuring the function blocks in the programming flowchart and an execution logic between the function blocks;
    determining a first function block and a second function block from the programming flowchart, wherein the first function block is used for obtaining at least two pieces of first information to be processed, different pieces of the at least two pieces of first information correspond to different information processing results, and the second function block is used for obtaining information processing results corresponding to the first information; and
    configuring a first control between the first function block and the second function block, wherein the first control is used for determining a current information processing result according to the first information currently detected from the first function block and transmitting the current information processing result to the second function block;
    wherein configuring a first control between the first function block and the second function block comprises:
        creating the first control in the first interface; and
        connecting an input end of the first control to the first function block, and connecting an output end of the first control to the second function block; and
    wherein creating the first control in the first interface comprises:
        obtaining optional branches matching the first function block and an output result corresponding to each optional branch through guide information, wherein the number of the pieces of first information to be processed in the first function block is consistent with the number of optional branches set in the first control, and each of the output results comprises an information processing result configured for each of the pieces of first information; and
        creating the first control according to the optional branches and the output results.

2. The method according to claim 1, wherein obtaining optional branches matching the first function block through guide information comprises:
    obtaining an image comprising a plurality of objects to be processed;
    identifying object information for each object from the image; and
    grouping the identified object information to obtain at least two pieces of first information, wherein each of the optional branches corresponds to one piece of first information.

3. The method according to claim 1, wherein obtaining an output result corresponding to each optional branch through guide information comprises:
    in a second interface associated with the first interface, displaying input prompt information corresponding to each of the optional branches, wherein the second interface is used for obtaining an information processing result configured for the first information; and
    according to the input prompt information, obtaining information processing results corresponding to the optional branches as the output results of the optional branches.

4. A graphical programming method comprising:
    in a first interface, displaying a programming flowchart matching a target task to be executed, wherein the programming flowchart comprises at least two function blocks used for implementing the target task, and the first interface is used for configuring the function blocks in the programming flowchart and an execution logic between the function blocks;
    determining a first function block and a second function block from the programming flowchart, wherein the first function block is used for obtaining at least two pieces of first information to be processed, different pieces of the at least two pieces of first information correspond to different information processing results, and the second function block is used for obtaining information processing results corresponding to the first information; and configuring a first control between the first function block and the second function block, wherein the first control is used for determining a current information processing result according to the first information currently detected from the first function block and transmitting the current information processing result to the second function block;

wherein creating the first control in the first interface comprises:

automatically generating the corresponding first control in the first interface according to the number of the pieces of first information to be processed in the first function block, wherein the number of optional branches set in the first control is consistent with the number of the pieces of first information; and in each optional branch of the first control, respectively configuring the information processing result corresponding to each of the pieces of first information as an output result of the optional branch.

5. The method according to claim 4, wherein, before automatically generating the corresponding first control in the first interface according to the number of the pieces of first information to be processed in the first function block, the method further comprises:

obtaining an image comprising a plurality of objects to be processed;

identifying object information for each object from the image; and determining at least two pieces of first information according to the identified object information.

6. The method according to claim 4, wherein, in each optional branch of the first control, respectively configuring the information processing result corresponding to each of the pieces of first information as an output result of the optional branch comprises:

displaying a list of candidate results matching the first control, wherein the list of candidate results comprises the information processing results respectively corresponding to each of the pieces of first information;

determining target information processing results corresponding to the first information currently to be configured from the candidate result list;

obtaining a drag instruction generated by performing a drag operation on the target information processing results; and in response to the drag instruction, dragging the target information processing results into the output results corresponding to the first information.

7. A graphical programming method comprising:

in a first interface, displaying a programming flowchart matching a target task to be executed, wherein the programming flowchart comprises at least two function blocks used for implementing the target task, and the first interface is used for configuring the function blocks in the programming flowchart and an execution logic between the function blocks;

determining a first function block and a second function block from the programming flowchart, wherein the first function block is used for obtaining at least two pieces of first information to be processed, different pieces of the at least two pieces of first information correspond to different information processing results, and the second function block is used for obtaining information processing results corresponding to the first information; and configuring a first control between the first function block and the second function block, wherein the first control is used for determining a current information processing result according to the first information currently detected from the first function block and transmitting the current information processing result to the second function block;

wherein, after configuring a first control between the first function block and the second function block, the method further comprises:

obtaining a first operation performed on the first control; adjusting the first control to a disabled state in response to the first operation, wherein the disabled state is used to indicate that the first control is suspended from running; or obtaining a second operation performed on the first control; adjusting the first control to an enabled state in response to the second operation, wherein the enabled state is used to indicate that the first control is restored for running.

8. The method according to claim 1, wherein determining a first function block and a second function block from the programming flowchart comprises:

obtaining attribute description information corresponding to each function block in the programming flowchart, wherein the attribute description information is used for describing an attribute of information to be processed in a function block;

determining a function block whose attribute description information indicates that it comprises at least two pieces of information as the first function block;

obtaining a first result type of the information processing results corresponding to the first information to be processed in the first function block; and searching the function blocks for a function block corresponding to the first result type as the second function block matching the first function block.

9. The method according to claim 4, wherein determining a first function block and a second function block from the programming flowchart comprises:

obtaining attribute description information corresponding to each function block in the programming flowchart, wherein the attribute description information is used for describing an attribute of information to be processed in a function block;

determining a function block whose attribute description information indicates that it comprises at least two pieces of information as the first function block;

obtaining a first result type of the information processing results corresponding to the first information to be processed in the first function block; and searching the function blocks for a function block corresponding to the first result type as the second function block matching the first function block.

10. The method according to claim 7, wherein determining a first function block and a second function block from the programming flowchart comprises:

obtaining attribute description information corresponding to each function block in the programming flowchart, wherein the attribute description information is used for describing an attribute of information to be processed in a function block;

determining a function block whose attribute description information indicates that it comprises at least two pieces of information as the first function block;

obtaining a first result type of the information processing results corresponding to the first information to be processed in the first function block; and searching the function blocks for a function block corresponding to the first result type as the second function block matching the first function block.

\* \* \* \* \*